United States Patent [19]

Nabkel et al.

[11] Patent Number: 6,011,845

[45] Date of Patent: Jan. 4, 2000

[54] METHOD AND SYSTEM FOR TWO-WAY CALL HOLDING USING AN INTELLIGENT COMMUNICATION DEVICE

[75] Inventors: Jafar S. Nabkel; Donald E. Gillespie; Gregory W. Bruening, all of Boulder, Colo.

[73] Assignees: US West, Inc., Denver; MediaOne Group, Inc., Englewood, both of Colo.

[21] Appl. No.: 08/998,799

[22] Filed: Dec. 29, 1997

[51] Int. Cl.[7] .............................. H04M 3/00; H04M 3/42; H04M 7/00

[52] U.S. Cl. .......................... 379/266; 379/201; 379/209; 379/219

[58] Field of Search ..................................... 379/265, 266, 379/309, 201, 207, 209, 210, 216, 217, 219, 220

[56] References Cited

U.S. PATENT DOCUMENTS

| | | | |
|---|---|---|---|
| 5,155,761 | 10/1992 | Hammond | 379/266 |
| 5,185,782 | 2/1993 | Srinivasan | 379/266 |
| 5,311,574 | 5/1994 | Livanos | 379/266 |
| 5,436,967 | 7/1995 | Hanson | 379/265 |
| 5,511,112 | 4/1996 | Szlam | 379/265 |
| 5,692,033 | 11/1997 | Farris | 379/265 |

*Primary Examiner*—Scott Wolinsky
*Assistant Examiner*—Benny Q. Tieu
*Attorney, Agent, or Firm*—Brooks & Kushman

[57] ABSTRACT

A partitioned communication system includes a shared switch network system in communication with an Intelligent Network Processor (INP). A terminating intelligent communication device (ICD) located outside the management and control of the shared network operates as an Originating Communication System (OCS) to negotiate 2-way call holding with a Called Communication System (CCS).

7 Claims, 4 Drawing Sheets

METHOD AND SYSTEM FOR TWO-WAY CALL HOLDING USING AN INTELLIGENT COMMUNICATION DEVICE

TECHNICAL FIELD

This invention relates generally to call management systems and, more particularly, to a 2-way negotiated call holding method and system using an Intelligent Communication Device (ICD).

BACKGROUND ART

The majority of telecommunication services currently being provided are deployed in centralized systems within the public-switched telephone network (PSTN). As those skilled in the art will recognize, the PSTN comprises the complete public telephone system, including telephones, local and trunk lines, and exchanges. Telephones in a home or business are commonly connected to a serving central office, also called a switch, by a pair of copper wires called the local loop. Switches are connected to one another with multiple lines called trunks. A trunk is a circuit connecting telephone switches or switching locations. Trunks and lines both carry communications. Trunks, however, connect switching equipment together, whereas lines connect a telephone, computer terminal or other device to the PSTN. The PSTN comprises millions of miles of lines and handles voice and data communications throughout the world.

The PSTN further includes service activation and control functionality to perform two basic tasks: (1) service delivery, i.e., the provision and modification of telephone services; and (2) service assurance, i.e., maintenance of the system. The service activation and control functionality takes the form of complex hardware and software and embodies specialized services which reside on circuit switching systems or adjunct platforms located within the network. Such services include, for example, Custom Local Access Signaling Services, referred to by the acronym CLASS, and Intelligent Network (IN) services, such as, for example, Advanced Intelligent Network (AIN) services.

Class services are one of the many types of switch-based services which must be accessed by subscribers off-hook by entering appropriate activation codes. These services include, for example, Automatic Call-back (AC), Automatic Recall (AR), etc. AIN services are employed using an Advanced Intelligent Network architecture.

A representative diagram of an AIN architecture provided for use in a Public Switch Telephone Network is shown, for example, in FIG. 1 and designated generally by reference numeral 10. Network 10 includes at least one switch or service node 12 in electrical communication with a plurality of servicing switches (central offices) 14 via Service Transfer Points (STPs) 15 and Transaction Capability Application Part (TCAP) signaling protocol or other suitable signaling protocol. Service node 12 is typically operative as the home switch or a virtual Service Switching Point (SSP) for subscribers to existing switch-based services. Thus, service node 12 is shown including a Service Control Point (SCP) 16 which contains the service logic and associated data support, as well as sufficient memory to execute customer services.

Service node 12 further includes service switching point (SSP) 18 which is a node (usually the subscriber's local switch/central office switch) that recognizes the "triggers" used when a subscriber invokes an intelligent network service and then communicates with the SCP to operate the service. SSP 18 and SCP 16 are provided in electrical communication with service node 12 and may, in some situations, be combined in a single device known as a Service Switching Control Point (SSCP) wherein the functions of the SCP and the SSP are combined. Subscribers typically use these communications services with a simple telephone (usually a Dual-Tone Multi-Frequency (DTMF) compatible communication device).

Emerging telecom deregulation coupled with technological advances have resulted in the advance of many new solutions which no longer rely on centralized communications functionality such as that described above which is hosted in the shared public switched telephone network. Personal computer (PC) based telephony, for example, now delivers some of the same voice messaging, caller identification, and call management features which were previously found only in large network systems. Residential gateways, an emerging technology, will soon also deliver some CLASS-like features in a Customer Premises Equipment (CPE) devices. Additionally, the internet is emerging as an alternative transport medium for voice and data communications. Still further, special-featured screen phones are being designed to work with network services.

All of these new technologies, however, either replicate network functionality entirely within the CPE, or rely on existing communications functionality in the network. This reliance has resulted in CPE devices which are of limited functionality and use.

A CPE device having greater functionality would have special application in performing call management services. Consider, for example, the problem of call holding as set forth in detail in co-pending patent application Ser. No. 08/998,802, the disclosure of which is hereby expressly incorporated by reference. As discussed, being placed on hold is an unpleasant and frustrating experience for most telephone callers as it constitutes wasted time. The advent of Interactive Voice Response (IVR) units and integrated call management systems by order response centers, businesses, and technical support centers, often results in callers being placed on hold for long periods of time. The pressure on these service centers to reduce costs, typically through fewer agents available to answer calls, has further exacerbated the problem. Hold times of half an hour to an hour are now fairly common.

Because most service centers provide no indication of how long a call will be held or indicate how much longer the hold will last, callers often feel left in limbo for an indefinite time. These extended held calls require the caller to stay on the line for the duration of the hold resulting in a large telephone bill. As a consequence, significant numbers of callers who are put on hold for more than a brief time period abandon their calls and hang up in resentment and frustration. This result is, of course, bad for customer relations and constitutes wasted effort. More importantly, it results in lost business for the service centers.

Furthermore, the hold state is a waste of telephone resources. It unproductively ties up the telephone of the caller as well as the telephone lines, trunks, and switching resources being used to maintain the connection between the caller and the switching system of the service center. If freed, these resources could be used productively for other calls.

To overcome some of these problems, a variety of arrangements have been proposed which alert the caller that has been placed on hold to when the hold is removed. The alerting takes the form of an audible or a visual signal generated at the telephone of the caller. The alerting arrangements enable the held caller to do something else instead of having to cradle the telephone handset to his or her ear listening for the service center to take the call off hold. Alerting arrangements help make the time spent on hold less annoying for the held caller.

U.S. Pat. No. 3,961,142 illustrates a typical alerting device. A primary disadvantage with these alerting devices is that they require all lines from the caller to the service center to remain open. Thus, the caller must stay on the line for the duration of the call which results in significant toll costs. Furthermore, the caller is not allowed to place or receive other calls.

Other proposed arrangements include automatic call-back systems. When an incoming call is not answered by an agent of a service center within a predetermined time period (e.g., three rings), an automatic call-back system answers the call and plays a pre-recorded announcement. The announcement gives the caller the option of either having the call placed in a queue to wait for an agent to pick up, or hanging up and being called back when an agent becomes available. If the caller selects the call-back option, the system either obtains the telephone number of the caller from the telephone network by means of Automatic Number Identification (ANI), or requests the number from the caller. The caller then hangs up. When an agent becomes available, the system places a new call to the caller and connects the call to the available agent at the service center.

U.S. Pat. Nos. 5,436,967, 5,185,782, and 5,155,761 illustrate automatic call-back systems. A primary disadvantage with automatic call-back systems is that they leave callers wondering whether the systems will honor their place in queue and whether the service center will call back. Because the called service center is in control, the caller cannot monitor the status of the held call and cannot initiate a reconnection. Furthermore, the caller is required to divulge his call-back telephone number. Moreover, call-back systems assume that the service center is willing to pay for the call-back. Typically, service centers, especially those providing technical product support involving long detailed calls to solve customer problems, are not willing to pay for calls back to the caller. Quite to the contrary, they expect callers to pay for the call and to wait on hold for indefinitely long periods of time.

Consequently, a need exists for a communication method and system which obviates complete reliance on centralized communications functionality within the shared public network, yet, which neither replicates network functionality entirely within a CPE or relies on existing communications functionality within the network. Such a system would have particular application for implementing call management features including, for example, two-way negotiated call hold.

A need further exists for a communication method and system as described above which would allow for communications services to be automatically initiated by a subscriber by providing a hardware/software device such as a communication card, other magnetic media, or possibly software or firmware in communication with the subscriber's CPE device.

DISCLOSURE OF THE INVENTION

It is, thus, a principle object of the present invention to provide a communications method and system which avoids reliance on centralized communications functionality without replicating network functionality entirely within a CPE device or relying entirely on existing communications functionality within the network.

It is a further object of the present invention to provide a partitioned communication method and system having multiple inter-dependent parts which are distributed across a CPE-public network boundary.

It is still another object of the present invention to provide a partitioned communication method and system wherein the corresponding communication services and intelligence are built into both the shared public network and specialized CPE devices which function to exchange commands and signalling.

It is still a further object of the present invention to provide a partitioned communication method and system of the type described above, wherein the specialized devices utilize event-based processing to interrupt or analyze communications based on predetermined triggered events in collaborative communication with the shared public switch network and other CPE devices.

It is still a further object of the present invention to provide a partitioned communications method and system of the type described above wherein the specialized CPE device functions as an Originating Communication System (OCS) and is operable to negotiate a two-way call hold with a Called Communication System on behalf of a calling party.

It is still another object of the present invention to provide a partitioned communication method and system of the type described above using event-based processing wherein the desired communication services may be implemented by providing a portable hardware/software device in conjunction with a subscriber's CPE device.

It is still a further object of the present invention to provide a partitioned communication method and system of the type described above using event-based processing wherein the hardware/software device is operative to automatically initiate communication services.

In carrying out the above objects and other objects, features and advantages of the present invention, there is provided a partitioned communication system including a specialized CPE device (e.g. an Intelligent CPE Device (ICD)) having the requisite intelligence to exchange commands and signalling with the management and control functionality of a shared switch network system such as the Public Switched Telephone Network (PSTN). An Intelligent Network Processor (INP) is further provided in communication with this network functionality and is capable of connecting multiple logical connections. The INP is operative to provide a general-purpose computing platform on which the shared switch network or other service provider can deploy algorithms to control service behavior. In this manner, multiple inter-dependent parts of the communication service may be distributed across the boundary of the ICD and the shared network.

In an alternative embodiment, the specialized CPE device uses event-based processing to interrupt or analyze communications based on predetermined triggered events in communication with the shared switch network and other CPE devices.

In yet another alternative embodiment, the specialized CPE devices described above are operable to provide communication services in a partitioned communication system in conjunction with a portable hardware/software device such as a communication card or other suitable storage media such as magnetic media or firmware directly receivable by the specialized CPE device.

It is contemplated that such hardware/software devices would be purchased from the communications service provider or at retail outlets such as electronics stores, department stores, grocery store check-out lines, specialty stores, etc. If embodied as a card, it is further contemplated that the hardware/software devices will be similar in size and shape to a credit card or a floppy disk and would embody one or more communications services in a digital format or other suitable storage medium.

In still another alternative embodiment, the portable hardware/software device described above is further operable to auto-initiate a command dialog with an associated service partition hosted in the shared switch network system.

In yet a further alternative embodiment, at least one specialized CPE device of the type described above, such as an ICD using event-based processing, is implemented as an Originating Communication System (OCS) in a partitioned communication system including a shared switch network and an INP.

As described herein, the CCS is operable with the partitioned communications system to connect a call from the calling party to an agent of the called party. The CCS is further operable to notify the calling party that the call is placed on hold.

The Originating Communications System (OCS), i.e., the specialized CPE device, is operable to communicate with the calling party and the CCS. The OCS negotiates on behalf of the calling party with the CCS to put the calling party in a queue for an agent when the calling party is placed on hold so that the call can be disconnected. The calling party is notified when a selected position in the queue has been reached and the call between the calling party and the called party is then reconnected.

In still another alternative embodiment, a two-way call hold system is provided as described above wherein the subscriber may receive periodic information status updates from the Called Communications System. Each update is initiated as a result of timer-based events and request messages from the subscriber's ICD via the INP to the Called Communications System.

In each of the embodiments described above, a terminating intelligent communication device (ICD) such as, for example, a non-network specialized CPE device is located outside the management and control of the shared switch network system and defines a boundary therebetween. The ICD is preferably, but not necessarily, logically connected to the INP via a dedicated signaling path and is further operative to provide a device-independent representation of internal processing and user actions based on predetermined states of the ICD in response to predetermined triggered events. In accordance with this architecture, multiple interdependent parts of the communication service may be distributed across the boundary of the ICD and the shared network.

BEST MODES FOR CARRYING OUT THE INVENTION

As will be described below, the generalized partitioned communication system disclosed herein allows the configuration of a specialized CPE device such as an ICD to exchange commands and signalling with the corresponding management and control functionality of a shared switch network so as to provide partitioned communication services. In a preferred embodiment, the ICD is operable to recognize specific events for specific types of communications and to then perform specific actions based on that event and the current situation at the time the event occurred. These events include, but are not limited to, requests by a device (or person) to initiate an out-bound communication to connect an incoming communication, or additional events based on the current in-progress status of a communication. As readily seen, the possible associated actions are limitless and include the CPE performing specific functions at the time of the event, requesting (signaling) another CPE device or network system to perform specific functions, transferring control in connection of the communication to another CPE device or network system, or requesting any of the above for a specific date and time.

Figure 2:
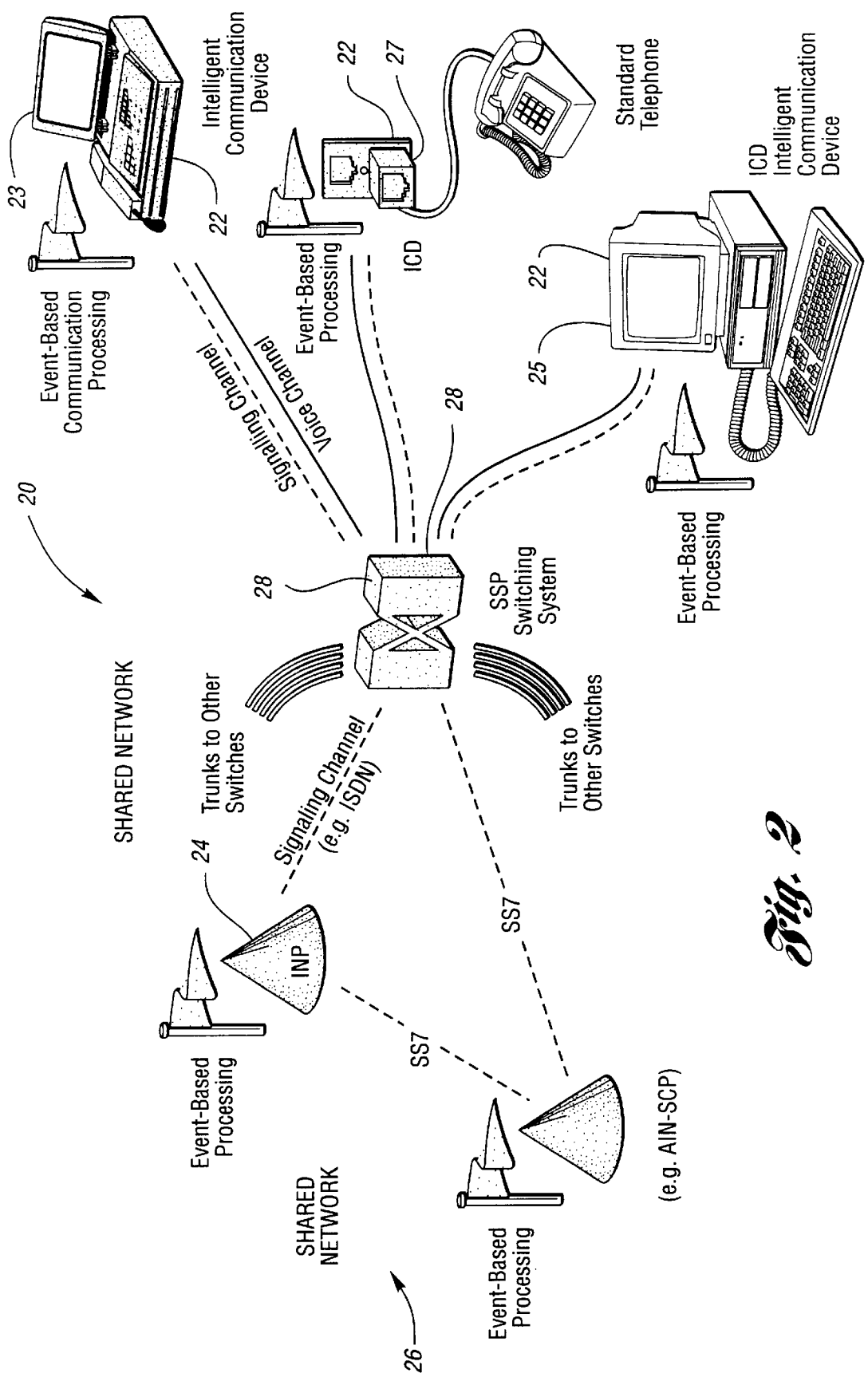
FIG. 2 is a schematic representation of the partitioned communication system of the present invention.

A preferred architecture for the invention is shown in FIG. 2 and designated generally by reference numeral 20. FIG. 2 illustrates a preferred embodiment wherein event-based processing is provided in one or more CPE devices, each using command messages to collaborate and cooperate with other CPE devices and network systems. These command messages might be physically transmitted in-band of the communication channel, or they might be transmitted out of band on separate signaling and control channels (e.g. the Integrated Services Digital Network (ISDN) "ID" channel or other access connections) such as, for example, a wireless connection for signaling between the network and a CPE device.

As will be described in further detail below, in this embodiment an extendable set of event triggers are provided and associated actions of the CPE device are based therein. An important distinction between this invention and functionality which presently exists in CPE telephony software today is that the disclosed system also includes the processing and signaling protocols to enable the CPE device to communicate control command messages (signals) to and from a shared network system. This collaborative and cooperative arrangement is not possible in existing CPE devices.

Referring still to FIG. 2, the preferred network arrangement 20 comprises at least one and preferably, but not necessarily, several intelligent communication devices (ICD's) 22 such as, for example, a screen telephone 23, a computer 25, a wall-plug-in device 27, etc. and at least one Intelligent Network Processor (INP) 24. The ICD's 22 are physically located outside the management and control of the shared network 26. The INP's 24, in contrast, are physically located within the management and control of the shared network 26. The shared network 26 can be the PSTN as referred to above, a private telephone network, a public data network, a private data network, etc. Such networks can be owned and operated by a single private provider, or through access arrangements, by multiple network providers.

In a preferred embodiment, the ICD's 22 are logically connected to the INP's 24 using dedicated signaling paths. As shown in FIG. 2, these connections may be ISDN Basic Rate Interference (BRI) D-channel virtual circuit connections as described above. Those skilled in the art, however, will clearly recognize that other signaling arrangements may serve the same purpose, including, but not limited to, ISDN Primary Rate Interference (PRI), Signaling System No. 7 (SS7, etc.), Digital Subscriber Loop (DSL). Most access protocols and arrangements in existence today describe one or more out-of-band signaling channels in addition to the bearer or transport channels. These signaling paths may be permanently established or temporarily connected. Temporary signaling paths may be established by either the ICD's 22, or by the INP 24. Permanent signaling paths may be managed by the ICD's 22, the INP 24, or other network managing systems not described here but within the knowledge of those skilled in the art.

In keeping with the invention, the INP 24 is defined as a network processor which typically, but not necessarily, is centralized and which is capable of terminating multiple logical connections to multiple ICD's 22. Many signaling arrangements are, of course, possible using existing techniques. Thus, while FIG. 2 shows dedicated virtual circuits on ISDN D-channels from each ICD 22 to the INP 24, other arrangements are, of course, both available and contemplated by Applicants.

The intelligent communication between each logically connected ICD 22 and INP 24 does not involve processing from the switching system 28 which may comprise, for example, a Service Switching Point (SSP). As shown in FIG. 2, switching system 28 in the system described acts as a "pass-through" element in order to transport the intelligent communication messages between the logically connected ICD 22 and INP 24. It is understood, however, that where the SSP functions primarily as an intermediary with respect to communication between the ICD 22, and INP 24, it nonetheless has a physical role in the overall system and maintains physical connections therein. Applicants contemplate that other possible arrangements will have the switched network 28—SSP or another adjunct, such as an Intelligent Network Translator (INT) (not shown)—perform a simple protocol conversion from ISDN D-channel to another deployed signaling protocol, such as SS7.

INP 24 is envisioned by Applicants as a general-purpose computing platform on which the network provider or other service providers may deploy algorithms to control service behavior. INP 24 may, therefore, be deployed solely for the purpose of providing services conforming to those described herein, or for providing services according to multiple architectures and protocols.

The ICD's 22 disclosed herein differ from existing communication devices in that they provide a conceptual model of the processing contained within the ICD. This conceptual model, referred to as a Device State Model (DSM) presents to the INP 24 a view of the state of the device. Because ICD's can be embodied in many physical forms, the DSM provides a device-independent representation of internal processing and user actions.

The physical forms in which an ICD 22 may be embodied include, for example, ISDN telephones, screen phones, personal computers, paging devices, personal communication system (PCS) handsets, cellular telephones, special devices plugged into wall receptacles, or automated teller machines. Indeed, almost any physical terminating communication device may be enhanced to serve as an ICD in accordance with the invention described herein.

Figure 3:
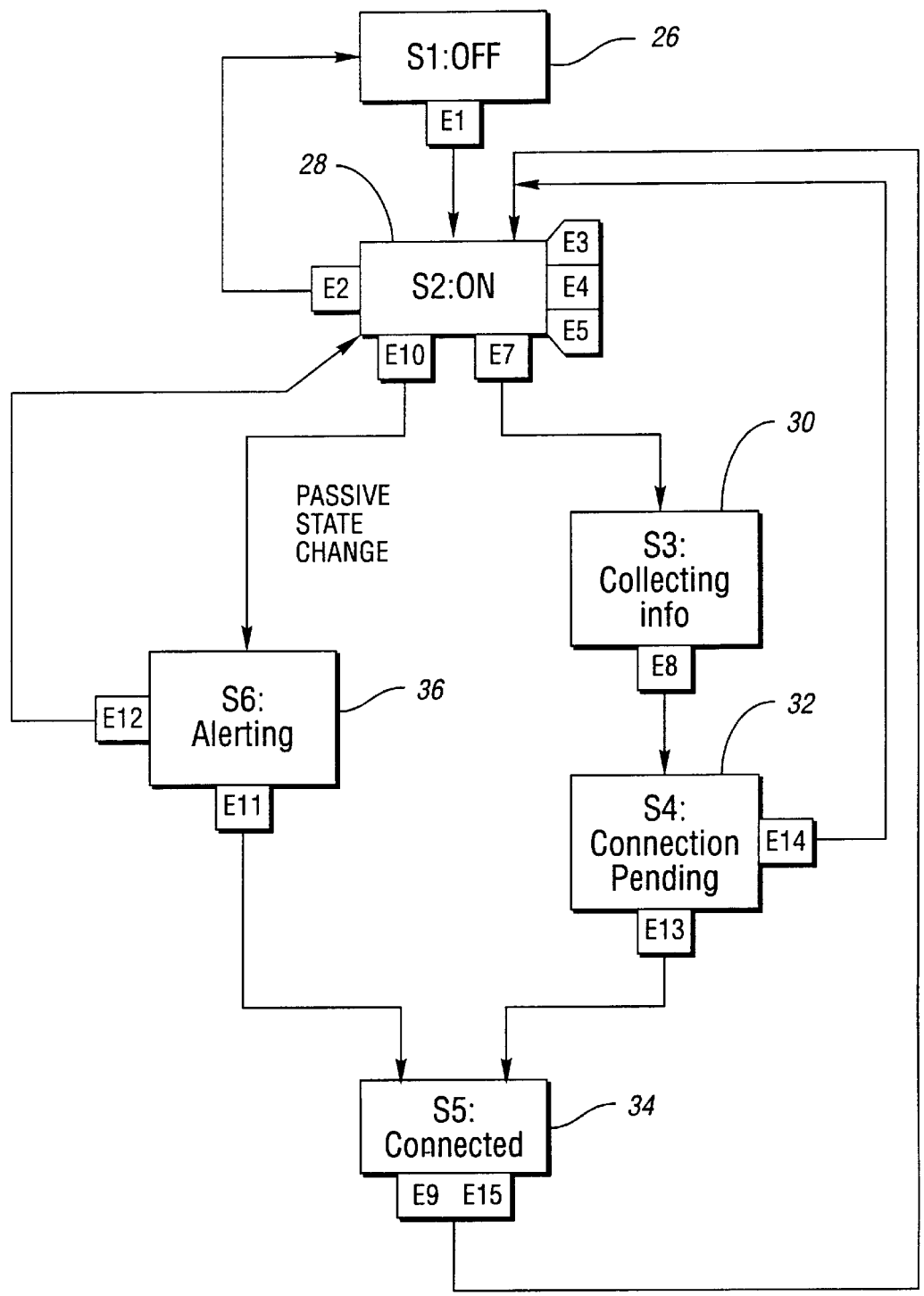
FIG. 3 is a generalized flow diagram of a device state model (DSM) implemented in the partitioned communication system of the present invention.

Referring now to FIG. 3 of the drawings, the DSM is illustrated as a typical device for establishing voice or data communications through a shared public switch network. As readily seen, there is a similarity with the Basic Call State Model (BCSM) described for the Advanced Intelligent Network. The difference between the AIN BCSM and the DSM described herein is that the AIN BCSM describes events in terms of how existing classified network exchanges interpret events that a user or Customer Premises Equipment may generate, whereas the DSM operates directly on Customer Premises Equipment or other such ICD's. While the introduction of and changes to the BCSM require massive and expensive upgrades to network exchanges, the introduction of and changes to the DSM require inexpensive changes to ICD's 22 and minor software changes to the INP 24. This flexibility and cost advantage provides significant improvements in the cost and speed at which new services may be deployed by a network or service provider.

Referring still to FIG. 3 of the drawings, the DSM is described as set of states that represent the internal state of the device. A set of transitions is defined between the states. Transitions may represent changes from one state to another state, as well as from one state back to the same state. In addition, at each transition, an event is described. When an event occurs, i.e., a transition between states is about to occur, the ICD 22 may inform the INP 24. The INP may then respond to the ICD 22 as will be described below. Although some discrete period time elapses for this message exchange between the ICD 22 and the INP 24, the DSM considers that messaging to be atomic, i.e., no other events can occur during event processing. Should a real physical action occur during event processing, the DSM will logically queue such actions until the event processing can continue.

The invention device state model shown in FIG. 3 illustrates six possible states and fifteen typical events. Some events, such as, for example, E2, E3, E4, E5, and E6 can occur during any state accept S1. A description of each of these states is as follows:

S1 (26): The Off-state indicates that the device has been powered down or otherwise made inactive.

S2 (28): The On-state indicates that the device has been powered on or otherwise made active.

S3 (30): The Collecting-Info-state indicates that the device is in the process of establishing a connection to the network.

S4 (32): The Connection-Pending state indicates that the device has requested the network to establish a connection, but that the connection has not yet been completed.

S5 (34): The Connected state indicates that the device is active in a connection through the network.

S6 (36): The Alerting state indicates that the device has been requested to receive a connection from the network, but that the connection has not yet been completed.

FIG. 3 further illustrates transitions between the above-described states that occur during a typical connection establishment. Not shown are all transitions that occur from one state back to the same state. Also not shown are transitions that are requested to be performed by the INP 24. These will be described below:

Before any state transition occurs, a DSM defines one or more events. In the DSM shown in FIG. 3, the following events are defined.

E1: Powered-On: The device has been powered on or otherwise made active.

E2: Powered-Off: The device has been powered off or otherwise made inactive.

E3: Feature-Activated: A user of the device has requested a feature to be performed. This feature activation occurs as the result of a button depression, a switch-hook depression, the insertion of a card into the device, or other similar actions. This feature may or may not be related to the establishment of a connection.

E4: Timer-Expired: An internal timer set by the device has expired. This timer may or may not be related to the establishment of a connection.

E5: Network-Originated-Event: A network element has signaled an event to the ICD. This network signaling is outside the DSM. Typically, this event is the result of a message from a network element other than the INP, such as a switching exchange.

E6: Internal-Originated-Event: The ICD has encountered an internal event during internal feature processing.

E7: Connection-Initiated: The user or device has initiated the establishment of a connection through the network. Depending on the device, the attached network switching device may or may not be aware of the connection initiation. For instance, a cellular telephone may collect digits before sending them to the network, whereas traditional analog telephone sets signal an off-hook connection to the network before address collection.

E8: Address-Signaled: The user or device has entered a network address for connection establishment. This event may be generated en-bloc, where a complete network address has already been specified, or as individual digits or characters are entered.

E9: Disconnected: The user or device has requested that an existing connection through the network be terminated.

E10: Termination-Attempted: A connection from the network has been requested.

E11: Connection-Accepted: A connection request from the network has been accepted by the user or device.

E12: Connection-Rejected: A connection request from the network has been rejected by the user or device. The cause for rejection may be because of screening, resource exhaustion, busy, no answer, or other conditions defined by the ICD.

E13: Connection-Accepted-Far-End: A connection request from the network has been accepted by the user or device.

E14: Connection-Rejected-Far-End: A connection request from the network has been rejected by the user or device. The cause for rejection may be because of screening, resource exhaustion, busy, no answer, or other conditions.

E15: Disconnected-Far-End: The device or user at the far end of the connection has requested that the existing connection through the network be terminated.

It should be understood that certain events can occur during any state. For simplicity, these are not shown in FIG. 3. For example, events E2, E3, E4, E5 and E6 can occur during any state except S1.

When the ICD 22 detects an event that occurs during execution of the DSM, a message may be sent to the INP 24. The INP 24 may then send a message to the ICD 22, to other network elements, or to additional ICD's such as, for example, those logically connected to the network. At least three types of messages are contemplated by Applicants and defined for communication between ICD's 22 and INP's 24, collectively referred to as entities. These include:

Inform: One entity wishes to inform another entity that an event has occurred. For instance, the Inform message may be used by the ICD to tell the INP that it detected an event during the execution of the DSM. The ICD may then wait for a subsequent response from the INP or to continue execution without waiting for a response.

Request: One entity requests information or instructions from another entity. For instance, the Request message may be used to query another network element for data that resides in a network database, such as a public key for encryption.

Instruct: One entity instructs another entity to perform an action. For instance, an INP may use the Instruct message to tell the ICD to execute a state transition in the DSM or to invoke certain feature logic resident in the ICD.

The above-described messages are exchanged using any standard data communications protocol. One possible embodiment of these messages is to use the Transaction Capability Application Part (TCAP) protocol, a commonly available protocol to encapsulate such transactional messages.

Messages are exchanged between ICD's 22 and INP's 24. In some access arrangements, messages may be exchanged directly between ICD's of a connection, such as in-band DTMF tones for voice connections or user-to-user information packets for ISDN terminals. Applicants contemplate, however, that an INP may perform message inter-working between incompatible ICD's. Consider, for example, two ICD's built by different vendors. The two ICD's are involved in a connection with each other. Each intelligent communication device implements the ICD/INP signaling connection using a different protocol. Because the two ICD's cannot communicate feature information directly, one ICD may send a request message to the INP. The INP may then formulate a request message using a different protocol and sent that to the other ICD. Similarly, the second ICD may respond with an informed message, which may be translated by the INP and sent to the original ICD.

As an example of the above-described interworking, consider a case where a voice telephone user dials an automated banking application. This application is designed to require a personal identification number (PIN) from the voice telephony user. The automated banking application ICD could send a request message to the network requesting a PIN. The INP would then send an Instruct message to the voice ICD to voice a prompt to the user and collect digits from the telephone key pad. The voice ICD might respond with an informed response which the INP will forward back to the banking application ICD to complete the connection.

Applicants further contemplate that the invention described herein would be operable to support one ICD in communication with an INP which in turn uses the traditional network such as, for example, the Public Switched Telephone Network to communicate with another user on a traditional (non-intelligent) Customer Premise Equipment device. This simplified arrangement will allow users of Intelligent Communication Devices to gain all the advantages that those devices enable on their terminating end while also seamlessly inter-operating with the existing public shared network.

The communication system described herein thus enable entirely new communication services that heretofore were all together not possible or required SSP enhancements or costly centralized processing. Examples of such new distributed communication services permitted by the present invention include, for example, No Solicitation, Dynamic Do Not Disturb, encrypted authorization services, services employing mid-call information queries, etc.

As those skilled in the art will again recognize, No Solicitation services are limited today by the lack of Interactive Voice Response (IVR) units in each local access and transport area (LATA). An improved No Solicitation service permitted by the invention would allow the network to screen an incoming call and then signal the Customer Premises Equipment device to play the appropriate no solicitation message without ever ringing the customer's terminating phone. Alternatively, the call processing logic can reside in the customer premises device itself. Clearly, if the terminating telephony device was in the middle of processing a call, and a customer picked up the handset to place a call, the telephone device would need to appropriately inform the customer "to either please hold or to abort the other communication in process,"—if the customer had only a single incoming line. With multiple lines, (e.g. ISDN BRI), the customer could place a call on a separate line.

A screen phone user interface would also greatly simplify the customer scheduling of Do Not Disturb time frames and corresponding actions. Furthermore, with event-based processing in each terminating telephony device, the invention allows different DND parameters and configurations in each device. With command control signaling between the CPE device and the network, the processing parameters could be transmitted between the two and stored in the network as back-up and for incoming call processing.

As described above, distinctive busy services are also permitted by Applicant's invention. Because each telephony device enabled with event-based processing as described herein will have a unique identifier (configured at installation time, and relative to the terminating line shared by one or more devices) the network may identify specify telephony devices within a customer premises. This may be accomplished with different signals, or signal parameters. This new service would allow distinctive ringing to be accomplished by ringing a specific phone when a specific number is dialed.

In operation, adaptor devices such as that shown in FIG. 2 might also be placed at each telephone wall socket which would enable the network to directly address (signal) those outlets—all without any changes to the telephone itself. Applicants contemplate that with such a service, every phone in a customer premise could have a unique identifier (e.g. one for each parent, one or two business numbers, one for each child, etc.). Of course, the network could also have processing rules defining which back-up terminating telephony device to ring if the primary one is not answered.

Still further, inter-premises ringing may also be allowed by the disclosed invention. Using the same capabilities described above, this service would encounter an "origination event (trigger)" in a customer premises device which would allow the customer to "call" another phone at the same premises, all sharing the same premises wiring. In short, the origination event could signal the network, the customer would enter a special code sequence, (e.g. #—code followed by a 2-digit number designating the other phone), and the network would signal the telephony device to ring, and then, optionally, drop the local loop to the premises. The two parties, on different extensions at the premises, could then speak with one another.

In an alternative embodiment, a communications system may be provided as shown in FIG. 2 and described above with the modification that there is further provided a portable hardware/software device such as a communication card for implementing partitioned communication services in conjunction with the ICD and the shared switch network. The communication card may, but is not required to, auto-initiate these services. This communication card would be receivable by one or more dedicated slots in the appropriate ICD and would deliver the distributed communications service. An exemplary ICD as contemplated by Applicants is shown, for example, in FIG. 4. It is anticipated that such communication cards could be purchased directly from the service provider or, alternatively, at convenient retail outlets, department stores, specialty stores, etc. Each communication card would perhaps be similar in size and shape to a credit card or a floppy disk and would embody one or more communications services in a digital format or other suitable format on magnetic storage medium or other suitable storage medium.

As readily seen, this portable structure enables creative bundling of services to target different consumer segments. The fact that these services are actually delivered on a physical card overcomes one of the major purchase hurdles for "invisible" network-based services today for many consumers do not associate high value with an intangible service.

Figure 1:
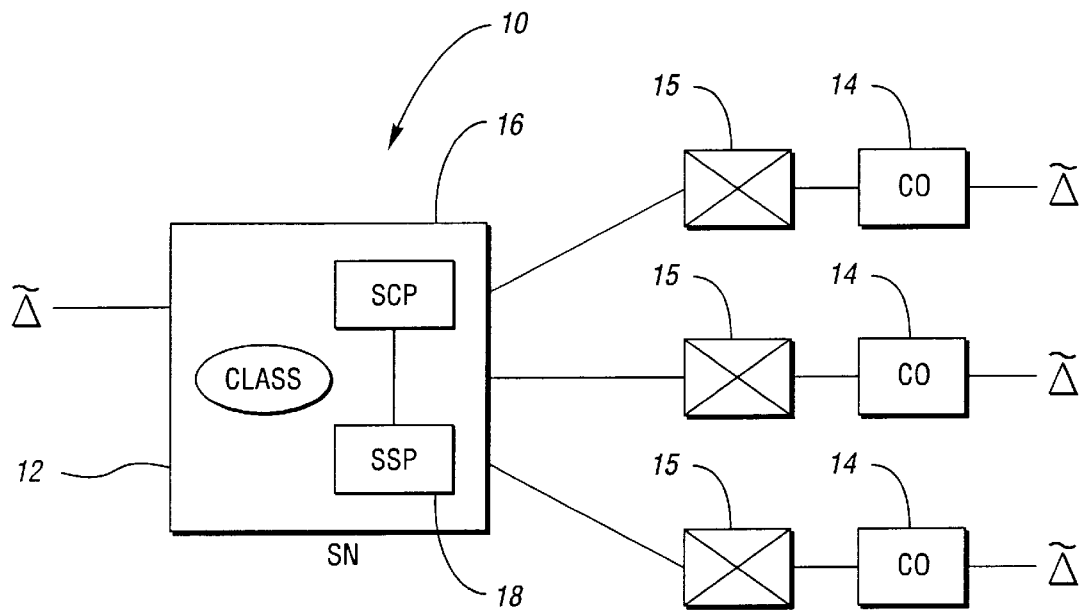
FIG. 1 is a schematic representation of a prior art Advanced Intelligent Network (AIN) architecture.
Figure 4:
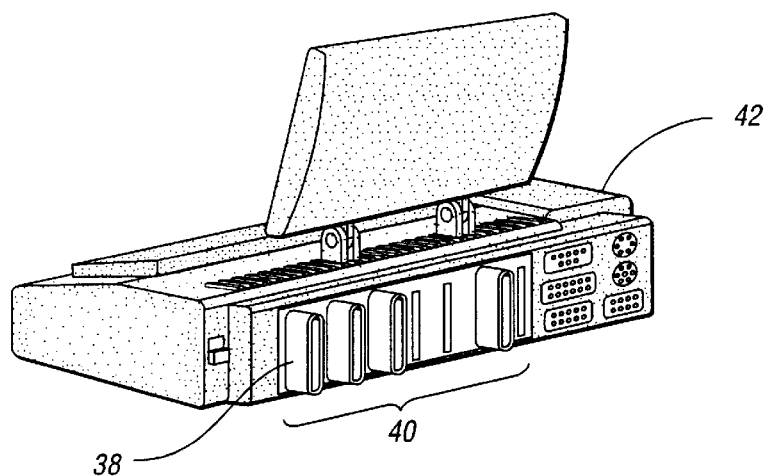
FIG. 4 is a schematic representation of an exemplary ICD as contemplated by applicants for receiving a portable hardware/software device such as a communication card.

Still referring to FIG. 4, in operation, a subscriber could activate her newly purchased portable communication card 38 by plugging it into a receptacle slot 40 in the ICD 42. As indicated above, the CPE device might be a new generation of screen phone, a communication card compatible personal computer, a mobile telephone with one or more communication card slots, a plug-in device to a wall socket receptacle, or a residential gateway device located on the customer premises. Of course, the physical size and design of each CPE device and the corresponding hardware/software device, i.e., communication card, would vary according to the application.

While the preferred embodiment for the plug-in device discussed above provides for a portable communication card for the customer partition, it is, of course, contemplated that anyone skilled in the art could modify the same such that the partition will be delivered on other magnetic media such as a floppy disk, a high density Zip or JAZ disk, or a pre-configured hard disk drive as well as in software such as on a personal computer, or as firmware built-in or plugged-in to a CPE system. All are, of course, natural extensions of the invention and contemplated by the applications.

The partitioned, distributed nature of the communications services disclosed herein and, in particular, communications services that are partitioned and distributed between a customer's premises and a shared network, enables an entire generation of services not possible today. While network partitions have configuration and data knowledge about other systems in the network, CPE partitions have configuration and data knowledge about other CPE systems. In most cases, the network partitions and systems do not physically know about nor can they directly access specific CPE systems. Likewise, CPE partitions and systems do not physically know about nor can they directly access specific network systems. On the other hand, each domain might logically know about systems in the other domain. These two different domains—the network domain of systems and service partitions, and the CPE domain of systems and service partitions—have inward visibility with access between the two provided across standard access lines (e.g., the local loop twisted pair, the cable coax drop, a satellite downlink, etc.).

As readily seen, the partitioned service design disclosed in this invention allows the CPE partition to govern what it can control at the customer premises and allows the network partition to do the same in the network. This preserves privacy and security of devices and systems in each domain. Network systems can communicate with customer premises systems and vice versa. Systems in either domain can send command requests and instructions to systems in the other domain. These systems can, therefore, address, i.e., refer to, systems in the other domain.

As an example, a network partition might be able to send a command to a CPE service partition that refers to "the bedroom and den telephones," or the "living room lights," or "the pool heater switch." In each of these cases, the references are to logical devices, not to specific physical devices, circuits, outlets, etc. In addition to logical mapping, there is ability to direct a message to a particular physical device. Conversely, a CPE partition might send commands to a network partition to "distribute attached voice message to attached list," or "perform Internet information search based on attached criteria," or "activate additional digital line," or "update private in-coming call screen list with attached list."

As indicated above, the invention described herein enables limitless services that are not possible today. First, by delivering partitioned service functionality at the customer premises, it enables communications capabilities heretofore not possible. Both partitions can exchange commands and information with one another on behalf of the customer. Second, by delivering the customer partition on a portable media device (e.g., a communication card or other suitable hardware/software device), it opens retail channels heretofore unused and enables a customer to plug-in her partition and have that partition auto-initiate set-up and activation of the service with the shared network.

In addition to the communications services discussed above, a multitude of new communications services will thus become possible according to the present invention. These services include, but are not limited to, call screening and special call treatment services in the network or at the CPE based on called or calling party ID with commands to activate custom announcements, etc., at the CPE. Still further, home management services that control lighting, appliances, electrical usage, etc., might be implemented.

Yet still further, partitioned services might be provided which perform network-based (e.g., Internet or worldwide web) information searches on behalf of customer's custom parameters entered through CPE devices. Also, new generations of CLASS/AIN features might become available "on demand" (usage-based) through use of an appropriate hardware/software device. For example, call curfew, no solicitations, call forwarding all based on CPE-created and storage schedules, phone outlet controls, and screening lists. Customer custom announcements are even CPE managed and stored, though the network can activate specific messages for callers. Vice versa, the CPE partition can command standard, or shared announcements and caller redirection in the network.

Partitioned services that address a specific suite of capabilities might also be provided. Consider, for example, a vacation home manager, that when activated automatically schedules and controls lights and heating, delivers stored-up messages at specific times, records or requests specific television programming and communicates with shared networks (e.g., telephone networks, cable networks, power networks, Internet, satellite, etc.) to control pre-negotiated lower usage rates.

Figure 5:
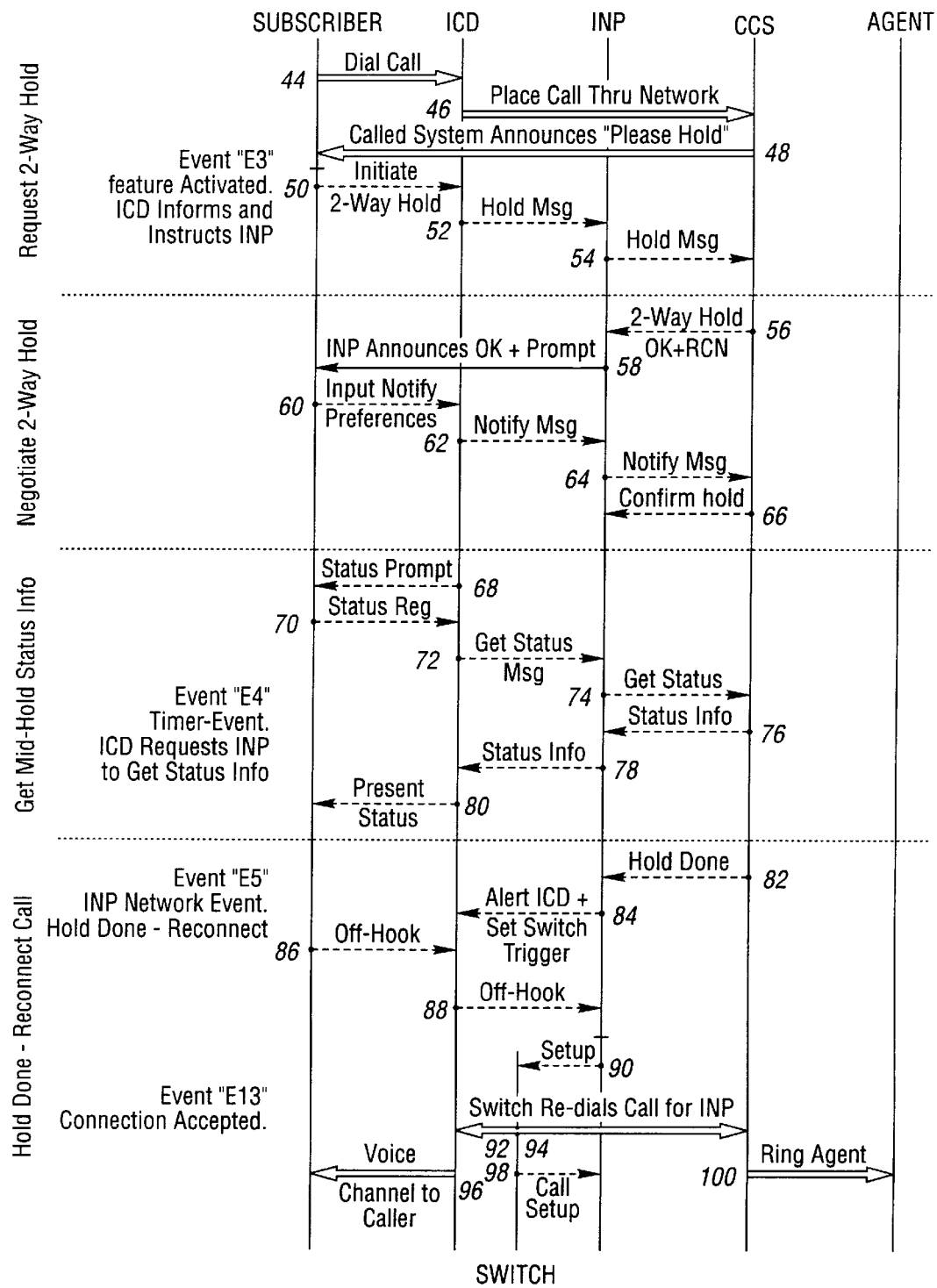
FIG. 5 is a schematic representation of the associated message exchanges in a two-way call holding system implemented in a partitioned communication system.

The partitioned communication system of the present invention may be further understood with reference to message exchanges shown in FIG. 5 of the drawings which correspond to a system for two-way negotiating call hold which are enabled by this invention, and in particular, and ICD having event-based processing in a shared switch network. Four segments of exemplary two-way negotiating hold service are shown. These include: requesting a two-way hold by the caller; negotiating the two-way hold with the called system; the callers request for mid-call status information to monitor the hold; and when the hold period is done, connecting the call between the caller and the responding agent.

As shown, the first segment begins when the subscriber dials a call 44 to another party, for example, the electronic technical support department on the subscriber's Intelligent Communication Device, (ICD). The ICD collects the dialed information and places a call 46 via the shared network, i.e., the PSTN to the called party. In this example, a Called Communication System, (CCS) at the electronic company's technical support department. The CCS determines that no agents are presently available. It then places the called party in a queue and plays an announcement 48, likely in the voice channel of the collected call, telling the caller to "please hold".

With no indication of how long the hold might be, the caller might otherwise become frustrated. This ICD, however, allows the caller to put their end of the call on hold. In the connected state (S5), the caller activates 50 the two-way hold feature (event "E3") This may be accomplished via any number of user interactions, including, but not limited to: pressing a special button such as a hard or soft key on the subscribers Intelligent Communication Device, selecting a menu option or graphic symbol on the subscribers ICD display, entering a special access code via the subscriber's ICD, or other similar interactions. The ICD receives the caller's feature activation and sends a 2-way Hold Request Message 52 [Instruct] to the Intelligent Network Processor (INP). The INP, in turn, translates the message as needed, and sends a 2-way Hold Request Message 54 [Instruct] to the CCS. This completes the initial segment of requesting a two-way hold.

The second segment begins with the CCS responding to the INP with a Two-Way Hold Granted (OK) Message 56 [Inform] along with some parameters for the two-way hold and a CCS Reconnect Contact Number. The INP could keep this Reconnect Contact Number private from the caller (to prevent unauthorized access to the CCS cue) just as it keeps the caller's originating number private from the CCS. When the INP receives the Two-Way Hold Granted (OK) Message 56, it may perform one of many functions. First, it may send a message (not shown) to the caller's ICD and instruct the ICD to play a specific announcement. Alternatively, it could even enclose a digitized announcement in the message.

A step further, as shown in FIG. 5, the INP itself could play an announcement to the caller via an intelligent peripheral or other suitable device, or instruct another network adjunct to play an announcement to the caller that the Two-Way Hold Request has been granted by the CCS. Additionally, the INP may prompt the caller 58 to enter her preference for when she wants to notified that her call is near the top of the CCS queue. This notification may be specified, for example, as "two slots from the top," or "three slots from the top", etc. Alternatively, an interval of time may be specificized such as, for example, "three minutes before an agent is likely available". Regardless of what preference options are provided to the caller and which preference the caller chooses, the caller's preference entry 60, constitutes a feature activation (event "E3") to the ICD.

The ICD, in turn, receives the caller's preference and, in response, transmits a Notification Preference message 62 [Inform] to the INP. The INP, in turn, sends a message 64 [Inform] to the CCS. The CCS accepts or overrides the preference request, and once all other two-way negotiations are completed, the CCS confirms the two-way hold to the INP with a Confirmation message 64 [Inform]. At this point, the INP may instruct the ICD as appropriate, the CCS and any other involved shared network equipment to disconnect the circuits for the original call.

The third segment in FIG. 5 illustrates the caller's ability to monitor the two-way held call by requesting periodic status information. As shown, the invention enables the ICD to automatically initiate status requests on behalf of the caller. To set up these periodic requests, the ICD generates an internal event and prompts the caller 68 to enter parameters for the status queries. For example, the prompt might include, but is not limited to, the frequency of the queries, the type of information to gather, how to present the information to the caller, i.e., display updates on your screen phone, window tops on a computer, page or messages, mobile telephone calls with data, etc., and what response options to offer the caller with each status response. These response options include, but are not limited to, continued periodic queries, reconnect, suspend queries until further notice, etc. The caller responds to the ICD prompt 70 with the appropriate feature activation in place.

As readily seen, a unique aspect of this invention—intelligent communication device timer events that result in direct message exchange with the network INP—is shown at 72 of FIG. 5. In this Example, the "check two-way hold status" timer expires triggering event "E4". The ICD generates a message 72 [Request] to the INP to get the caller's requested status from the CCS. The INP, in turn, sends a "Get Status" message 74 [Request] to the CCS. The CCS responds with the requested information with a message 76 [Inform] to the INP, which is relayed in message 78 [Inform] to the caller's ICD. The ICD presents the information to the caller 80 via one or more of the agreed methods as described above. This sequence, in this example, continues with timer events processed until the hold is completed or the caller instructs the ICD to stop gathering hold status information.

Finally, the fourth segment shown in FIG. 5 illustrates the completion of the two-way hold and reconnection of the caller with the CCS and on to a responding agent. Of course, other sequences may occur for the service, such as caller termination of the hold or other as disclosed in co-pending patent application Ser. No. 08/998,802. For this example, however, the simple path of completion and reconnection is illustrated.

When the CCS detects that the caller's position and the queue has reached the agreed notification point it generates a Hold Done Message 82 [Inform] to the INP. The INP sends an [Inform] Message 84 and creates a network-originated event ("E5") alerting the ICD that the hold is complete and that the ICD should notify the caller immediately. In addition, the INP may instruct the appropriate network switching system which is most likely the terminating SSP for the caller's line, to "trigger" to detect when the caller's ICD goes "off hook" (86, 88). This enables the switching system to intercept the off-hook origination attempt and rather than opening a circuit for another call, the switching system may connect a circuit between the ICD 92 and the CCS 94 to reconnect the held call. Likewise, the ICD opens the "voice" channel to the caller 96 and the CCS rings the available agent 100. In addition, the network switching system sends a message back to the INP 98 with notification that the call has been successfully reconnected between the ICD and CCS and thereby allowing the INP to complete its records and management of the two-way hold.

In summary, the invention described above and illustrated by the two-way negotiated call hold enabled thereby, provides a system for distributed communications between several intelligent communication devices and one or a few intelligent network processors. Network switching systems provide pass-through connectivity between the ICD's and INP's. In a preferred embodiment using event-based processing, each ICD embodies a device state model which operates directly on the Customer Premises Equipment. The DSM is described as a set of states with transitions between states or transitions back into the same state. At each transition, an event is described which may also include transmission of one or more messages to the INP. In turn, the INP may send messages to one or more ICD's and may also invoke events at the ICD.

While the best modes for carrying out the invention have been described in detail, those familiar with the art to which this invention relates will recognize various alternative designs and embodiments for practicing the invention within the scope of the appended claims.

What is claimed is:

1. For use in a partitioned communication system including a shared network system, and an Intelligent Network Processor (INP) located within the management and control of the shared switch network, a communications system for negotiating a 2-way call hold, comprising:

a Called Communications System (CCS) associated with a called party and operable to connect a call from a calling party to an agent of the called party, the CCS further operable to notify the calling party that the call is placed on hold;

a terminating Intelligent Communication Device (ICD) located outside the management and control of the shared switched network system, the ICD operative to negotiate on behalf of the calling party with the CCS to put the calling party in queue for an agent when the calling party is placed on hold so that the call can be disconnected, wherein the calling party is notified when a selected position in the queue has been reached and the call is between the calling party and the called party is then reconnected, the ICD being logically connected to the INP and operative to provide a device-independent representation of internal processing and user actions based on predetermined states of the device in response to triggered events.

2. A communication system as in claim 1, wherein the ICD negotiates with the CCS to maintain calling party in queue upon a request from the calling party.

3. A communication system as in claim 1, wherein the CCS provides the ICD with period information status updates of the calling party's status in the queue.

4. A communication system as in claim 1, wherein periodic information status updates of the calling party's status in the queue are initiated as a result of timer-based events and request messages from the ICD via the INP to the CCS.

5. For use in a partitioned communication system including a shared switch network system, and an intelligent network processor (INP) located within the management and control of the shared switch network, a method for negotiating a two-way call hold, comprising:

connecting a call from a calling party to an agent of a called party and notifying the calling party that the call has been placed on hold;

negotiating with a called communication system (CCS) associated with the called party via a terminating intelligent communication device (ICD) located outside the management and control of the shared switch network system to put the calling party in a queue for an agent when the calling party is placed on hold so that the call can be disconnected;

notifying the calling party when a selected position in the queue has been reached;

reconnecting the call between the calling party and the called party; and negotiating between the ICD and the CCS to maintain the called party in queue upon a request from the calling party.

6. The method as in claim 5, further comprising: providing the ICD with a periodic information status updates from the CCS regarding the calling party's status in the queue.

7. The method as in claim 5, further comprising: initiating period information status updates of the calling party's status in the queue as a result of timer-based events and request messages from the ICD via the INP to the CCS.

* * * * *